United States Patent [19]

Hale

[11] Patent Number: 4,957,761
[45] Date of Patent: Sep. 18, 1990

[54] POTATO PRESERVATION METHOD

[75] Inventor: Douglas B. Hale, Boise, Id.

[73] Assignee: Oppenheimer Companies, Boise, Id.

[21] Appl. No.: 342,585

[22] Filed: Apr. 18, 1989

Related U.S. Application Data

[63] Continuation of Ser. No. 175,593, Mar. 29, 1988, abandoned, which is a continuation of Ser. No. 80,160, Jul. 29, 1987, abandoned, which is a continuation of Ser. No. 809,169, Dec. 16, 1985, abandoned.

[51] Int. Cl.⁵ .................... A23B 7/06; A23B 7/148; A23L 1/216
[52] U.S. Cl. ................................ 426/410; 426/509
[58] Field of Search ............ 426/393, 404, 410, 509, 426/637, 412, 419, 316

[56] References Cited

U.S. PATENT DOCUMENTS

| | | | |
|---|---|---|---|
| 3,773,527 | 11/1973 | Ruggerone | 426/637 |
| 3,975,551 | 8/1976 | Shatila | 426/637 |
| 4,389,424 | 6/1983 | Hasegawa | 426/637 X |
| 4,517,211 | 5/1985 | Haraldsson et al. | 426/637 X |
| 4,579,743 | 4/1986 | Hullah | 426/637 X |

Primary Examiner—Arthur L. Corbin
Attorney, Agent, or Firm—Larson and Taylor

[57] ABSTRACT

Uncooked potato products are preserved by a process wherein the potatoes are peeled, cut, blanched, cooled, and dried. Then the potato products are packaged in a flexible vacuum bag which is evacuated, flushed with an inert gas, and sealed. The preservation process is designed to preserve pre-cut, uncooked potatoes for storage at 34°-38° F. for four to six weeks.

4 Claims, No Drawings

POTATO PRESERVATION METHOD

This application is a continuation of application Ser. No. 175,593, filed Mar. 29, 1988, now abandoned which is a continuation of Ser. No. 080,160, filed July 29, 1987, now abandoned, which is a continuation of Ser. No. 809,169, filed Dec. 16, 1985, now abandoned.

FIELD OF THE INVENTION

This invention relates to a method for preserving potatoes for storage at temperatures between 34° F and 38° F.

BACKGROUND OF THE INVENTION

Pre-peeled and pre-cut potatoes are immensely popular among consumers. Presently all potatoes which are pre-peeled and pre-cut are frozen and/or pre-cooked. A prior art method of preserving potatoes at refrigeration temperatures is disclosed in U.S. Pat. No. 3,773,527 (Ruggerone). In the Ruggerone patent the potatoes are cooked such that they are soft all the way through, dipped in a preservative, and then cut into the desired shapes.

U.S. Pat. No. 4,228,196 (Weaver et al) describes another process for preparing pre-cooked potato products. This process cooks raw potatoes at 81–83° C. for 5 to 45 minutes, heats these partially cooked potatoes to reduce the moisture content thereof, cooking the potatoes at 50–100° C. for another period of 5 to 45 minutes, and preserving the potatoes in the absence of starch suspensions.

Thus, while the prior art teaches methods of preserving potatoes, the methods in all instances require either pre-cooking or freezing the potatoes. There is a need in the art for making fresh, uncooked, pre-cut, and pre-peeled potatoes available in the refrigerator sections of supermarkets and the like ready to be cooked and save the consumer the trouble of having to peel and cut them. Also, since these potatoes will be fresh, uncooked, and not frozen, they will retain more of their natural starch, vitamins, taste and texture.

SUMMARY OF THE INVENTION

A method for preserving pre-cut, uncooked potatoes for storage at refrigeration temperatures which comprises the steps of:
(a) blanching pre-peeled, pre-cut potatoes to seal the outer surface without cooking the inside of the potatoes;
(b) rapidly cooling said blanched potatoes to below 45° F.;
(c) drying said cooled potatoes; and
(d) vacuum packaging said dried potatoes in an inert gas.

DESCRIPTION OF THE PREFERRED EMBODIMENT

Raw potatoes are peeled and placed in cool water at about 45 to 55° F. The cool water removes excess starch or other materials on the surface of the peeled potatoes and aids in preserving the potatoes for a short period of time prior to their being cut. The peeled potatoes are then cut into the desired shape (e.g. hash browns, french fries, steak fries, etc.). The cut potatoes are immediately placed in water at or under 45° F after they are cut, to aid in preservation of the potatoes and to rinse the surface thereof.

When a sufficient quantity of potatoes have been cut to form a batch, the potatoes are blanched in a liquid between 130° F and 190° F for 10 to 20 minutes. Water will normally be used for blanching the potatoes because it is inexpensive, non-toxic, and readily obtainable. Blanching is defined to be heating the potatoes in a liquid at a temperature between 130° F. and 190° F. for 10–20 minutes in order to effect a surface treatment of the potatoes, without cooking the inside of the potatoes. Prior to said blanching the pre-peeled, pre-cut potatoes preferably are kept at temperatures between 34° F. and 38° F.

The blanching step has been found to seal the outer surfaces of the cut potatoes and remove excess starch therefrom. Unlike the cooking steps of the prior art processes, the inside of the potatoes remains uncooked throughout the blanching operation. The sealing of the outer surfaces of the cut potatoes by the blanching step prevents starch from bleeding out of the inside of the potato. Lastly, the blanching step makes the outer surfaces of the potatoes whiter. This added whiteness remains for a period of up to nine weeks and makes the product considerably more appealing to the consumer. The ideal conditions for carrying out the blanching step were found to be immersion of the potatoes in water at 160° F. for 15 minutes.

Another advantage of the present invention over the prior art is attributable to cutting the potatoes prior to treatment. In the present invention the entire surface area of the finished product is treated because the potatoes are in their final shape at the time of treatment. This leads not only to the whiter appearance of the product, but also to the prevention of the bleeding of starch out from the inside of the potatoes. Bleeding of starch from the potatoes is undesirable because it causes a chalky buildup in the package and because the potatoes' nutrients bleed out along with the starch. Prior art processes are not designed to prevent starch from bleeding out of the potatoes, whereas the present invention eliminates this problem.

Another important advantage of the present invention is directly related to the surface sealing effect of the blanching step. No preservatives are necessary to obtain an acceptable shelf life in the present invention. Some of the prior art, including the Ruggerone patent, employ preservatives to extend the shelf life of their product to an acceptable level. The elimination of preservatives leads not only to a more natural product, but also to a cost savings to the producer. Once the cut potatoes have been blanched they are rapidly cooled to an internal temperature of 45° F or lower. The rapid cooling is best accomplished by immersing the potatoes in water between 34 and 39° F. Once again, the purpose of keeping the potatoes at refrigeration temperatures whenever possible is to aid in preserving the potatoes. The growth and presence of microorganisms is minimized by keeping the potatoes at low temperatures.

After cooling the potatoes any excess surface moisture is removed by drying them. The elimination of this moisture minimizes fogging of the package at a later time. Growth of microorganisms may also be reduced by drying since a dry environment is less conducive to microorganisms and especially bacteria.

The potatoes are now ready for vacuum packaging. The package is preferably a flexible vacuum bag fabricated from any suitable clear plastic material. The dried potatoes are placed in the vacuum bag and a vacuum is applied thereto, to evacuate the package. An evacuation of at least 90% is desirable and any amount greater than 90% is an added advantage. However, 90% appears to be the most cost effective level because it produces satisfactory preservation at a reasonable cost. Some oxygen (about 1-5%) should be allowed to remain in the package to inhibit the growth of anaerobic bacteria.

The evacuated vacuum bag is then flushed with an inert gas or mixture of inert gases. This step will fill the package with the inert gas and thereby create an inert atmosphere for the product. The vacuum bag is sealed to prevent any leakage of the gas outward and prevent penetration of air into the package. The vacuum bag must be composed of an air-impervious material. This is contrary to U.S. Pat. No. 4,515,226 (Myers) where the container was specifically designed to permit gas outflow. 100% nitrogen gas was found to be the best inert gas for this procedure. Argon and nitrogen-argon mixtures were also found to give acceptable results but argon is more expensive and has a tendency to cause an unpleasant odor in the package. Carbon dioxide promoted moisture loss from the potatoes. Due to this, carbon dioxide is not useful in the process. It is preferred that the cooled potatoes be maintained at 34° F. to 38° F. throughout the drying and vacuum packaging steps.

Finally, the sealed vacuum bag goes immediately to refrigeration. Preferred refrigeration temperatures are from between 34 and 38° F. If the product is stored at this temperature it may be kept for up to nine weeks although, to allow for a margin of safety, from the six weeks is the preferred maximum storage period of the potatoes.

In summary, the present invention permits pre-cut, uncooked, and non-frozen potatoes to be preserved under refrigeration conditions, without the addition of preservatives for a period of time long enough to allow the potatoes to reach the ultimate consumer in an unspoiled condition. Uncooked, non-frozen potatoes not only have more of the nutrients present, but also taste much fresher than either the pre-cooked or the frozen varieties.

The following example is included to further illustrate the invention.

Initially the potatoes are steam peeled under approximately 220 p.s.i. with a steam injection time of 14-20 seconds. They are then passed through two Vanmark Scrubbers for complete peal removal.

The peeled potatoes are sliced, diced or cut into french fries and immersed in cold water. The whole peels are placed in cold water immediately following scrubbing. Following inspection the potatoes are trimmed before blanching and transported through a blancher by an auger, which is covered with a reel, or screen. The following temperatures and dwell time are maintained:

EXAMPLE

| Potato Cut | Temp. | Dwell Time | Ideal Temp. | Ideal Dwell Time |
|---|---|---|---|---|
| ½" Crinkle Cut | 180°-195° F. | 13-15 min. | 190° F. | 14 min. |
| Slices | 180°-195° F. | 13-15 min. | 190° F. | 14 min. |
| Small Whole Peel | 180°-195° F. | 17-20 min. | 190° F. | 19 min. |
| Large Whole Peel | 180°-195° F. | 28½-33 min. | 190° F. | 31 min. |

The product is cooled and dried with ambient air on a screen shaker table. A flow of cold air is maintained for maximum cooling and fast drying.

The product is placed in plastic bags and a vacuum is applied to remove approximately 90% of the air The bag is then flushed with 100% nitrogen gas and when a nitrogen gas pressure of 30-32 p.s.i. is reached the package is heat-sealed. The package is a polyethylene/-laminated bag composed of 1 mil thick sheet of polyethylene sandwiched between 1 mil thick layers of nylon.

The filled bags are placed in cardboard cases and immediately placed into storage at a temperature of 34-38°. The product must be kept refrigerated at these temperatures during subsequent handling and prior to consumption.

It is claimed:

1. A method for preparing pre-cut uncooked potatoes for storage at refrigeration temperatures without the addition of preservatives, which consists essentially of the steps of:
    (a) blanching pre-peeled, pre-cut potatoes to seal the outer surface without cooking the inside of the potatoes;
    (b) rapidly cooling said blanched potatoes to an internal temperature of below 45° F.;
    (c) drying said cooled potatoes to remove surface moisture;
    (d) vacuum packaging said dried, uncooked potatoes in an inert gas, said cooled potatoes being maintained at a temperature of 35° to 38° F. during said drying and vacuum packaging; and,
    (e) storing said vacuum packaged potatoes at 34° to 38° F.

2. The method according to claim 1 wherein said inert gas is nitrogen.

3. The method according to claim 1 wherein said blanched potatoes are rapidly cooled in water having a temperature between 34° F. and 38° F.

4. The method according to claim 1 wherein said pre-peeled, pre-cut potatoes are kept at temperatures between 34° F. and 38° F. prior to said blanching step.

* * * * *